(12) United States Patent
Lee et al.

(10) Patent No.: US 9,286,401 B2
(45) Date of Patent: Mar. 15, 2016

(54) METHOD OF PROVIDING SEARCH SERVICE AND DISPLAY DEVICE APPLYING THE SAME

(75) Inventors: Bo-ra Lee, Seoul (KR); Ji-hye Chung, Seoul (KR); Hye-jeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 503 days.

(21) Appl. No.: 13/275,371

(22) Filed: Oct. 18, 2011

(65) Prior Publication Data

US 2012/0095983 A1  Apr. 19, 2012

(30) Foreign Application Priority Data

Oct. 18, 2010  (KR) .................. 10-2010-0101376

(51) Int. Cl.
   *G06F 7/02* (2006.01)
   *G06F 17/30* (2006.01)
   *G06F 3/0483* (2013.01)

(52) U.S. Cl.
   CPC ........ *G06F 17/30867* (2013.01); *G06F 3/0483* (2013.01); *G06F 17/30861* (2013.01); *G06F 17/30864* (2013.01); *G06F 17/30* (2013.01)

(58) Field of Classification Search
   CPC .............. G06F 17/30867; G06F 17/30864; G06F 17/30; G06F 17/30861; G06F 3/048; G06F 3/0481; G06F 3/0482; G06F 3/0483
   See application file for complete search history.

(56) References Cited

U.S. PATENT DOCUMENTS

| | | | |
|---|---|---|---|
| 7,185,001 B1* | 2/2007 | Burdick et al. ................ 1/1 |
| 7,793,230 B2* | 9/2010 | Burns et al. ............ 715/787 |
| 7,962,504 B1* | 6/2011 | Mehanna ................ 707/765 |
| 8,655,648 B2* | 2/2014 | Kulkarni et al. ............. 704/9 |
| 8,725,715 B2* | 5/2014 | Tijssen et al. ............ 707/706 |
| 2002/0178153 A1* | 11/2002 | Nishioka et al. ............ 707/3 |
| 2005/0027702 A1* | 2/2005 | Jensen et al. ............... 707/3 |
| 2007/0271247 A1* | 11/2007 | Best et al. .................. 707/3 |
| 2008/0071744 A1* | 3/2008 | Yom-Tov .................... 707/3 |
| 2010/0088629 A1* | 4/2010 | Xu ................... G06F 17/3064 715/780 |
| 2010/0145967 A1 | 6/2010 | Fu et al. |
| 2010/0223257 A1* | 9/2010 | Milic-Frayling et al. ..... 707/722 |
| 2010/0287150 A1* | 11/2010 | Downum .......... G06F 17/30864 707/706 |
| 2011/0015996 A1* | 1/2011 | Kassoway et al. ......... 705/14.49 |
| 2011/0137933 A1* | 6/2011 | Pelenur et al. ............. 707/769 |
| 2011/0179005 A1* | 7/2011 | Wang et al. .............. 707/706 |
| 2012/0072406 A1* | 3/2012 | Iwakura et al. ............ 707/706 |

FOREIGN PATENT DOCUMENTS

EP  2202656 A1  6/2010

OTHER PUBLICATIONS

Communication dated Dec. 21, 2011 issued by the European Patent Office in counterpart European Patent Application No. 11185410.5.
Communication dated Jul. 6, 2015 issued by the European Patent Office in counterpart European Patent Application No. 11 185 410.5.

* cited by examiner

*Primary Examiner* — Bruce Moser

(74) *Attorney, Agent, or Firm* — Sughrue Mion, PLLC

(57) ABSTRACT

A method of providing a search service and a display device applying the same are provided. According to the method of providing a search service, a web page that is searched by a specified keyword is accessed, at least one keyword is extracted from text included in the web page being accessed, and the at least one extracted keyword is displayed.

30 Claims, 8 Drawing Sheets

METHOD OF PROVIDING SEARCH SERVICE AND DISPLAY DEVICE APPLYING THE SAME

CROSS-REFERENCE TO RELATED APPLICATION

This application claims priority from Korean Patent Application No. 10-2010-0101376, filed on Oct. 18, 2010 in the Korean Intellectual Property Office, the disclosure of which is incorporated herein in its entirety by reference.

BACKGROUND

1. Field

Methods and apparatuses consistent with exemplary embodiments generally relate to a method of providing a search service and a display device applying the same, and more particularly to a method of providing a search service and a display device applying the same, which can perform a search for a web page.

2. Description of the Related Art

Recently, technology that can provide various kinds of services through the Internet has been applied to a television (TV) which receives broadcasts. For example, an Internet Protocol TV (IPTV) is connected to the Internet and executes applications such as widget and the like.

In this case, the TV uses a web browser and provides an Internet service. therefore, it is required for a user to use the web browser by pressing a specified button on a remote controller for web browser connection or through a menu.

However, when using the Internet through the TV, the Internet browser hides the screen of the TV, and thus a user is unable to concentrate his/her attention on the TV screen. Also, since the TV has insufficient user interface that is required to use the Internet browser, the user may feel inconvenienced when the user uses the web browser through the TV.

In particular, since it is difficult for a user to input characters using a TV remote controller, the keyword input and Internet search using the TV may be inconvenient to the user.

A user desires a display device with which the user can perform a search service more easily using a web browser. Accordingly, there is a need for schemes enabling a user to easily perform keyword input and search.

SUMMARY

Aspects of the exemplary embodiments address at least the above problems and/or disadvantages and to provide at least the advantages described below. Accordingly, an aspect of an exemplary embodiment provides a method of providing a search service and a display device applying the same, which can access a web page that is searched by a specified keyword, extract at least one keyword in text included in the accessed web page, and display the at least one extracted keyword.

According to an aspect of an exemplary embodiment, there is provided a method of providing a search service including accessing a web page that is searched by a specified keyword; extracting at least one keyword in text included in the accessed web page; and displaying the at least one extracted keyword.

The accessing the web page may include requesting a search for the specified keyword from a search engine; receiving a result of the search from the search engine and displaying the received result of the search on a screen; and accessing one web page among web pages that are included in the result of the search.

The extracting the keyword may include extracting a word that is positioned in the neighborhood of the specified keyword as the keyword.

The extracting the keyword may further include extracting at least one keyword among the text included in an area that is displayed on the screen of the whole web page.

The extracting the keyword may further include extracting a keyword in the order on the number of repetitions of words included in the web page.

The displaying the received result may include displaying the at least one keyword in the form of a list.

The displaying the received result may further include displaying a diagram having a ratio that corresponds to the whole web page; and displaying the at least one keyword in a position in the diagram that corresponds to the position in the web page.

The method of providing a search service may further include selecting one of the at least one keyword; and performing the search by setting the selected keyword as any one of an additional keyword, an excluded keyword, and a unique password.

The method of providing a search service may further include selecting one of the at least one keyword; and moving a screen to an area in which the selected keyword is displayed.

The moving the screen may include moving the screen so that the selected keyword is displayed on an upper end or an intermediate area of the screen.

According to an aspect of another exemplary embodiment, there is provided a display device including a communication unit accessible to an external device and a network; a display unit displaying an image; and a control unit controlling the display unit to control the communication unit to access a web page that is searched by a specified keyword, to extract at least one keyword in text included in the web page being accessed, and to display the at least one extracted keyword.

The control unit may request a search for the specified keyword from a search engine, receive a result of the search from the search engine, display the received result of the search on a screen, and access one web page among web pages that are included in the result of the search.

The control unit may extract a word that is positioned in the neighborhood of the specified keyword as the keyword.

The control unit may extract at least one keyword among the text included in an area that is displayed on the screen of the whole web page.

The control unit may extract a keyword in the order on the number of repetitions of words included in the web page.

The control unit may operate to display the at least one keyword in the form of a list.

The control unit may display a diagram having a ratio that corresponds to the whole web page, and display the at least one keyword in a position in the diagram that corresponds to the position in the web page.

The control unit may select one of the at least one keyword and perform the search by setting the selected keyword as any one of an additional keyword, an excluded keyword, and a unique password.

The control unit may select one of the at least one keyword and move a screen to an area in which the selected keyword is displayed.

The control unit may move the screen so that the selected keyword is displayed on an upper end or an intermediate area of the screen.

BRIEF DESCRIPTION OF THE DRAWINGS

The above and/or other aspects of the exemplary embodiments will be more apparent from the following detailed description when taken in conjunction with the accompanying drawings, in which.

DETAILED DESCRIPTION OF EXEMPLARY EMBODIMENTS

Hereinafter, exemplary embodiments are described in detail with reference to the accompanying drawings.

As used herein, the term "unit" may include a processor or microprocessor executing a computer program stored in a computer-readable medium.

Figure 1:
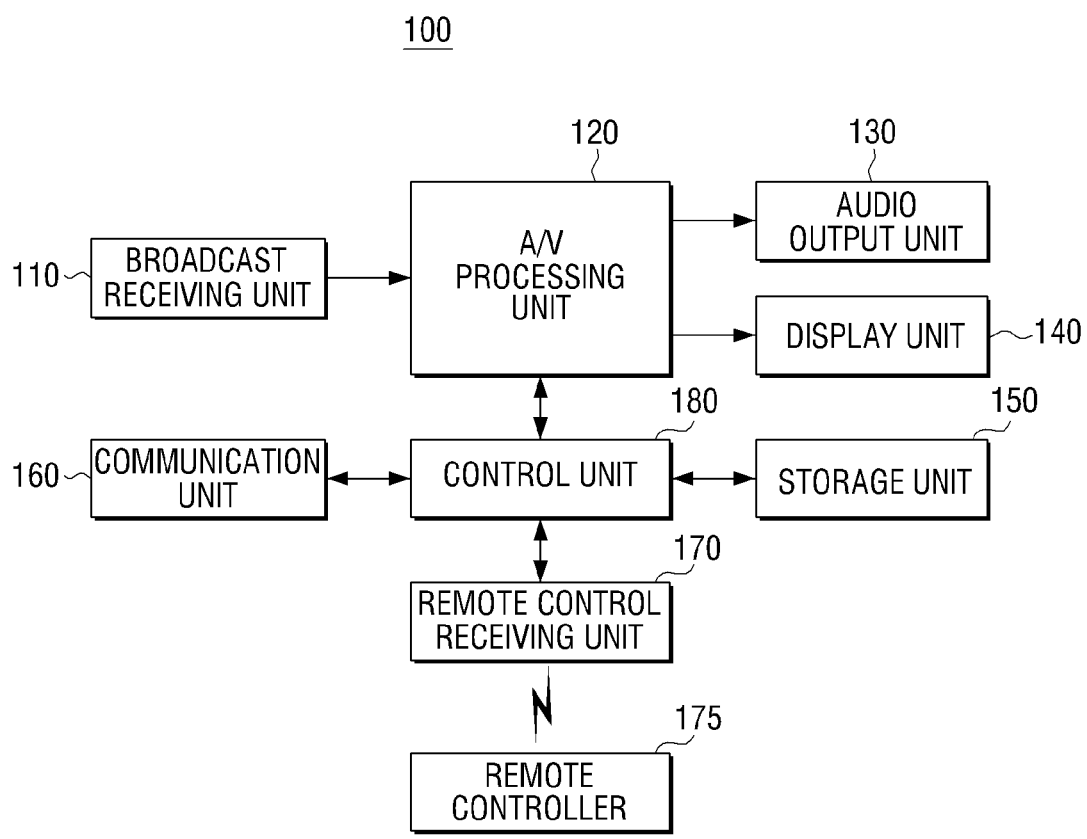
FIG. 1 is a block diagram illustrating the configuration of a TV according to an exemplary embodiment.

FIG. 1 is a block diagram illustrating the detailed configuration of a TV 100 according to an exemplary embodiment. As illustrated in FIG. 1, the TV 100 includes a broadcast receiving unit 110, an audio/video (AN) processing unit 120, an audio output unit 130, a display unit 140, a storage unit 150, a communication unit 160, a remote control receiving unit 170, and a control unit 180.

The broadcast receiving unit 110 receives a broadcasting signal by wire or wirelessly from a broadcasting station or a satellite and demodulates the received broadcasting signal. Also, the broadcast receiving unit 110 may receive broadcasting information.

The broadcast receiving unit 110 separates the received signal into a video signal and an audio signal, and a signal separation unit 120 transmits the video signal and the audio signal to the A/V processing unit 120.

The A/V processing unit 120 performs signal processes, such as video decoding, video scaling, audio decoding, and the like, with respect to the video signal and the audio signal input from the signal separation unit 120. Also, the A/V processing unit 120 outputs the video signal to the display unit 140, and outputs the audio signal to the audio output unit 130.

The audio output unit 130 outputs sound that is output from the A/V processing unit 120 through a speaker or to an external device (for example, external speaker) connected through an external output terminal.

The display unit 140 displays an image output from the A/V processing unit 130 on a display. That is, the display unit 140 displays a broadcasting image that corresponds to the broadcasting signal.

Also, the display unit 140 may display a keyword list that is a list of keywords extracted from a web page on a partial area of the screen. Here, the keyword list corresponds to the listing of the extracted keywords in a text included in the web page currently accessed.

Also, the display unit 140 may display a web page reduction map that displays a position of at least one keyword. The web page reduction map is displayed as a diagram that corresponds to the whole web page that is currently accessed. That is, the web page reduction map may be in the form of a tetragon that has the same aspect ratio as that of the web page. Also, inside the web page reduction map, keywords are displayed in positions of the extracted keywords. Using such a web page reduction map, a user can easily grasp which position the keyword occupies on the web page.

The storage unit 150 stores diverse programs for operation of the TV 100. Also, the storage unit 150 may store recorded image files. The storage unit 150 may be implemented by a hard disc, a nonvolatile memory, and the like.

The communication unit 160 connects the TV 100 to a communication network such as the Internet. Specifically, the communication unit 160 is connected to a search engine server that provides the Internet search service through the communication network such as the Internet. Also, the communication unit 160 transmits the input keyword to the search engine server, and receives search results that correspond to the keyword from the server.

The remote control receiving unit 170 receives a command from the remote controller 175, and transmits the command to the control unit 180. Specifically, the remote control receiving unit 170 receives an input of a user's operation for changing the size of a search window from the remote controller.

The control unit 180 grasps a user command based on the contents of the user's operation that is transferred from the remote controller 175, and controls the whole operation of the TV 100 in accordance with the grasped user command.

The control unit 180 controls the communication unit 160 to access a web page that is searched for by a specified keyword. Here, the specified keyword represents a keyword input by a user.

Specifically, the control unit 180 requests a search for a specified keyword from a search engine. Thereafter, the control unit 180 receives a search result from the search engine and displays the received search result on a screen. Then, the control unit 180 accesses one of the web pages included in the search result. At this time, the control unit 180 may access a web page selected by the user among the web pages included in the search result.

Thereafter, the control unit 180 extracts at least one keyword in text included in the accessed web page. Specifically, the control unit 180 may extract words that are positioned in the neighborhood of a specified search keyword as keywords. The specified keyword corresponds to a keyword that is input by the user to search for desired contents or a site. Accordingly, the specified keyword may include words related to the contents that the user desires to search for. Accordingly, there is a high possibility that the words in the neighborhood of the specified keyword correspond to the contents related to the specified keyword, and thus the words correspond to the contents desired by the user. Accordingly, the control unit 180 extracts the words positioned in the neighborhood of the specified keyword as keywords having high priority.

Also, the control unit 180 may extract at least one keyword among the text included in an area that is displayed on the screen of the whole web page. That is, the control unit 180 may set an area for extracting the keyword as an area that is currently displayed on the screen. There is high possibility that the contents in which a user is interested are included in the screen that is currently displayed. Accordingly, the control unit 180 may extract the text included in the screen area that is currently displayed as the keywords having high priority.

Also, the control unit 180 may extract the keywords in order of a number of repetitions of words included in the web page. There is a high possibility that a frequently repeated word is an important word or a word that a user desires to search for. Accordingly, the control unit 180 may extract the words having high frequency of repetitions among the words included in the web page as the keywords having high priority.

As described above, the control unit 180 may extract the keywords on the web page by combining diverse methods. Also, the control unit 180 may set priorities of the extracted keywords, and display the keywords according to their priority.

Figure 4:
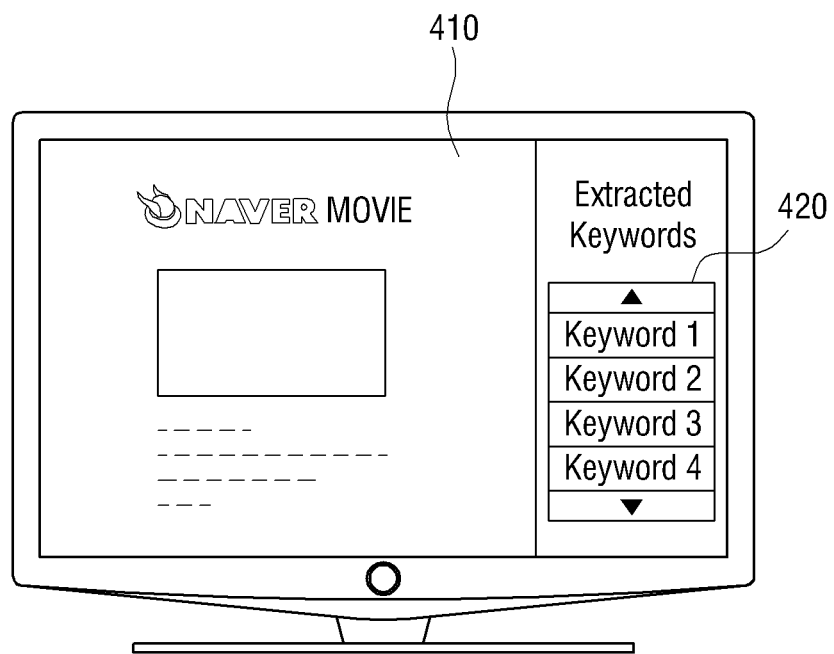
FIG. 4 is a diagram illustrating a screen on which a keyword list is displayed according to an exemplary embodiment.

On the other hand, the control unit 180 controls the display unit 140 to display the at least one extracted keyword. Specifically, the control unit 180 may control the display unit 140 to display at least one keyword in the form of a list. As described above, the control unit 180 may display a keyword list in which the at least one extracted keyword is listed. Also, the control unit 180 may arrange keyword items in the keyword list in the order of their priority. An example of such a keyword list is illustrated in FIG. 4.

Also, the control unit 180 may operate to display a diagram having a ratio that corresponds to the entire web page, and to display the at least one keyword in a position in the diagram that corresponds to the position in the web page. That is, the control unit 180 may display the keywords in the above-described web page reduction map. An explanation with respect to this feature, will be made later with reference to FIG. 5.

On the other hand, if any one of the keywords displayed on the screen is selected, the control unit 180 provides a function for the selected keyword. In this case, the control unit 180 receives a user's selection command from a remote controller 175.

Specifically, the control unit 180 may perform an additional search by setting the selected keyword as any one of an addition keyword, an excluded keyword, and a unique keyword.

Here, the additional keyword represents a keyword used for another search by including the selected keyword into the specified keyword that is the previously used keyword as an additional keyword. That is, the control unit 180 performs a search for sites that include both the specified keyword and the additional keyword. For example, if it is assumed that the specified keyword is "movie" and the keyword that is selected as the additional keyword is "drama", the control unit 180 performs an additional search for "movie drama".

Also, the excluded keyword indicates a keyword that excludes the result that includes the selected keyword from the results searched by a specified keyword. Accordingly, the control unit 180 performs a search with a specified keyword, and displays the search result through exclusion of all results including the excluded keyword. For example, if it is assumed that the specified keyword is "movie", and a keyword that is selected as the excluded keyword is "drama", the control unit 180 excludes all results that include "drama" from the search results that are obtained by performing a search with the keyword "movie", and displays the remaining search results on the screen.

Also, the unique keyword indicates a keyword for performing a further search with the selected keyword as an independent keyword. Accordingly, if the selected keyword is set as the unique keyword, the control unit 180 performs an additional search with the selected keyword as a keyword. A detailed explanation with respect to this feature will be made later with reference to FIG. 6.

As described above, the control unit 180 may set the selected keyword as any one of the additional keyword, the excluded keyword, and the unique keyword, and perform an additional search to meet the set keyword.

On the other hand, the control unit may perform a function of moving a screen to an area in which the selected keyword is displayed. That is, if a keyword that is not currently displayed on the screen is selected, the control unit 180 moves the screen to an area in which the selected keyword is displayed within the currently accessed web page area. In this case, the control unit 180 may move the screen so that the selected keyword is displayed on an upper end or an intermediate area of the screen. In relation to this, detailed explanation will be made later with reference to FIGS. 7 and 8.

By the above-described function, a user can select a desired keyword and directly confirm the portion in which the keyword is displayed.

The TV 100 having the above-described structure extracts and displays the keyword that is related to the currently accessed web page, and thus a user can confirm and select a desired keyword even without inputting a separate keyword. Also, if the keyword is selected, the TV 100 performs an additional search using the selected keyword or moves the screen to the position where the keyword is displayed, and thus a user can perform the additional search for desired contents or confirm the contents of the web page related to the keyword only by an operation for selecting the keyword.

Figure 2:
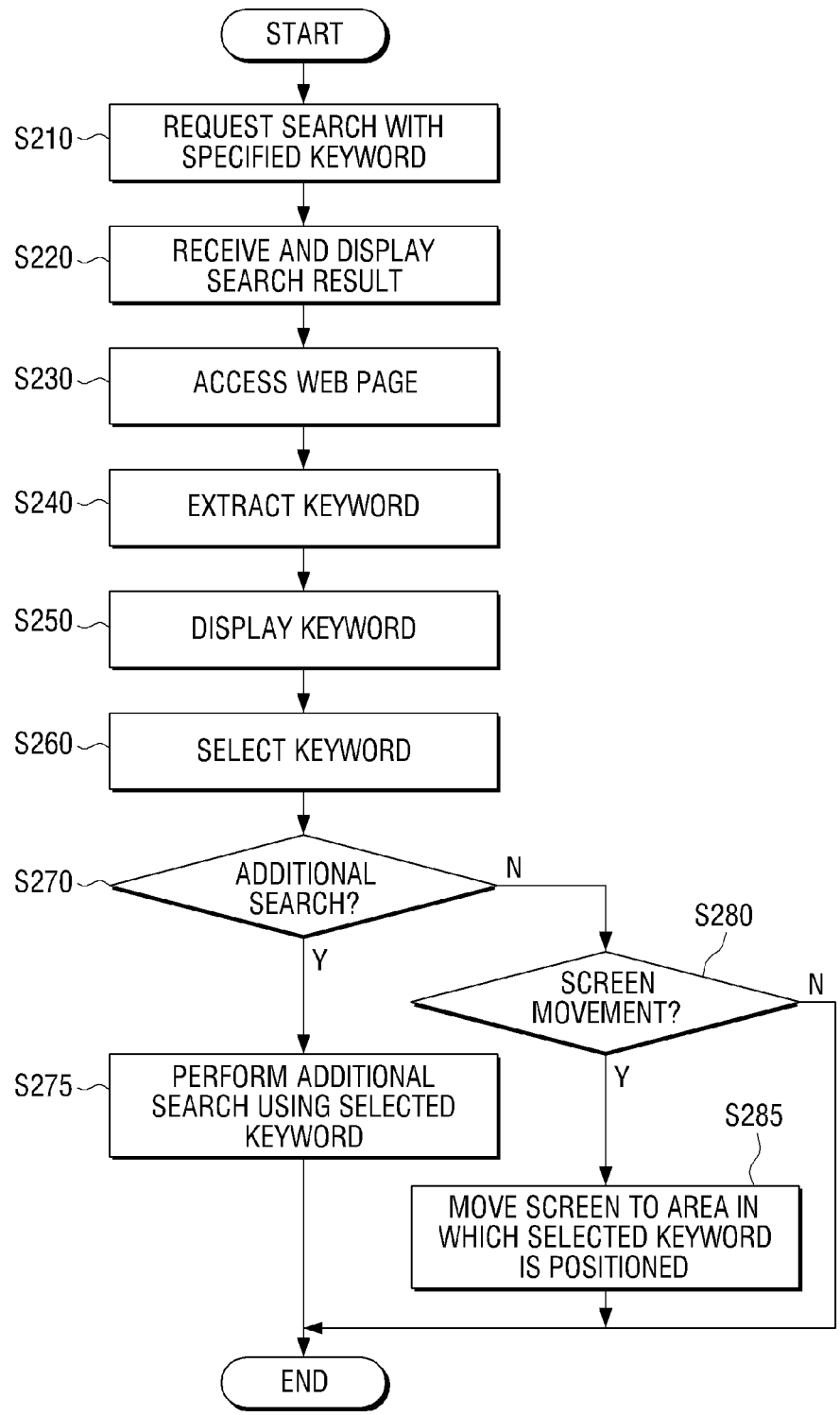
FIG. 2 is a flowchart illustrating a method of providing a search service according to an exemplary embodiment.

Hereinafter, with reference to FIG. 2, a method of providing a search service will be described. FIG. 2 is a flowchart illustrating a method of providing a search service according to an exemplary embodiment.

First, the TV 100 requests a search for a specified keyword from a search engine (S210). Here, the specified keyword indicates a keyword that is input by a user for search.

Thereafter, the TV 100 receives a search result from the search engine and displays the received search result on a screen (S220). Then, the TV 100 accesses one of web pages included in the search result (S230). At this time, the TV 100 may access a web page selected by a user among the web pages included in the search result.

Figure 3:
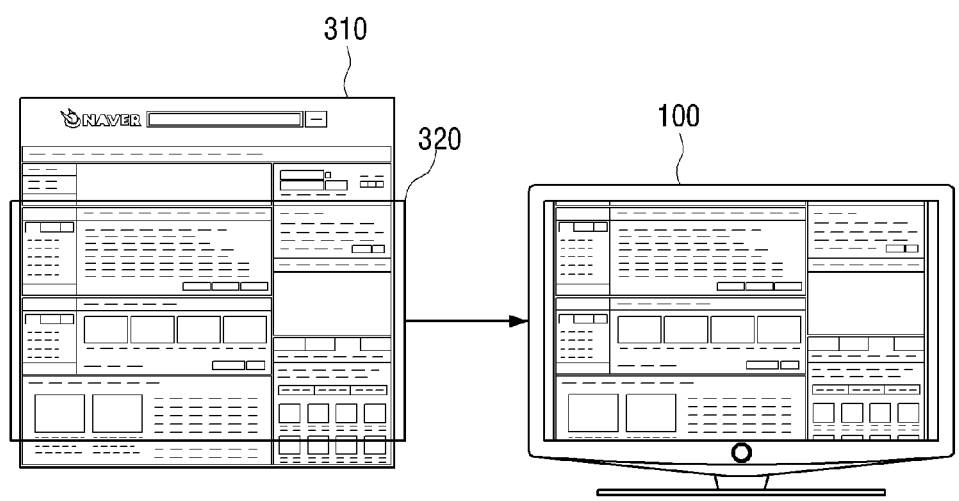
FIG. 3 is a diagram illustrating an area that is displayed on a screen on the whole web page according to an exemplary embodiment.

The screen of the TV 100 that accesses the web page will be described with reference to FIG. 3. FIG. 3 is a diagram illustrating an area 320 that is displayed on the screen on the whole web page 310 according to an exemplary embodiment.

As illustrated in FIG. 3, it can be confirmed that the whole web page 310 that is accessed by the TV 100 is longer or larger than the area 320 that is displayed by the TV 100 in upward/downward directions. Accordingly, it can be confirmed that the TV 100 displays the partial area 320 of the whole web page 310 on the screen. In this case, a user can move the area that is displayed on the screen in upward/downward directions by scrolling the displayed screen in upward/downward directions.

Referring again to FIG. 2, the TV 100 extracts at least one keyword in text included in the web page being accessed (S240).

Specifically, the TV 100 may extract words that are positioned in the neighborhood of a specified search keyword as keywords. The specified keyword corresponds to a keyword that is input by the user to search for desired contents or a site. Accordingly, the specified keyword may include words related to the contents that the user desires to search for. Accordingly, there is a high possibility that the words in the neighborhood of the specified keyword correspond to the contents related to the specified keyword, and thus the words correspond to the contents desired by the user. Accordingly, the TV 100 extracts the words positioned in the neighborhood of the specified keyword as keywords having high priority.

Also, the TV 100 may extract at least one keyword among the text included in the area that is displayed on the screen of the whole web page. That is, the TV 100 may set an area for extracting the keyword as the area that is currently displayed on the screen. There is high possibility that the contents in which a user is interested are included in the screen that is currently displayed. Accordingly, the TV 100 may extract the text included in the screen area that is currently displayed as the keywords having high priority.

Also, the TV 100 may extract the keywords in the order on the number of repetitions of words included in the web page. There is high possibility that a frequently repeated word is an important word or a word that a user desires to search for. Accordingly, the TV 100 may extract the words having high frequency of repetitions among the words included in the web page as the keywords having high priority.

As described above, the TV 100 may extract the keywords on the web page by combining diverse methods. Also, the TV 100 may set priorities of the extracted keywords, and display the keywords according to their priority.

On the other hand, the TV 100 displays the at least one extracted keyword (S250). Specifically, the TV 100 may display at least one keyword in the form of a list. As described above, the TV 100 may display a keyword list in which the at least one extracted keyword is listed. Also, the TV 100 may arrange keyword items in the keyword list in the order of their priority. An example of such a keyword list is illustrated in FIG. 4, and will be described hereinafter with reference to FIG. 4.

FIG. 4 is a diagram illustrating a screen in which a keyword list 420 is displayed. As illustrated in FIG. 4, the TV 100 includes a web page display area 410 and a keyword list display area 420.

In FIG. 4, a web site that is searched and accessed with a specified keyword "movie" is displayed on the display area 410. Also, the keywords extracted within the web page displayed on the web page display area are displayed in the keyword list display area 420. As illustrated in FIG. 4, it can be confirmed that "keyword 1", "keyword 2", "keyword 3", and "keyword 4" are displayed on the keyword list display area 420 as the keywords.

As described above, the TV 100 may display the extracted keywords in the form of a keyword list 420.

Referring again to FIG. 2, the TV 100 may display a diagram having a ratio that corresponds to the whole web page, and display the at least one keyword in a position in the diagram that corresponds to the position within the web page. That is, the TV 100 may display the keywords in the above-described web page reduction map. In relation to this, an explanation will be made later with reference to FIG. 5.

Figure 5:
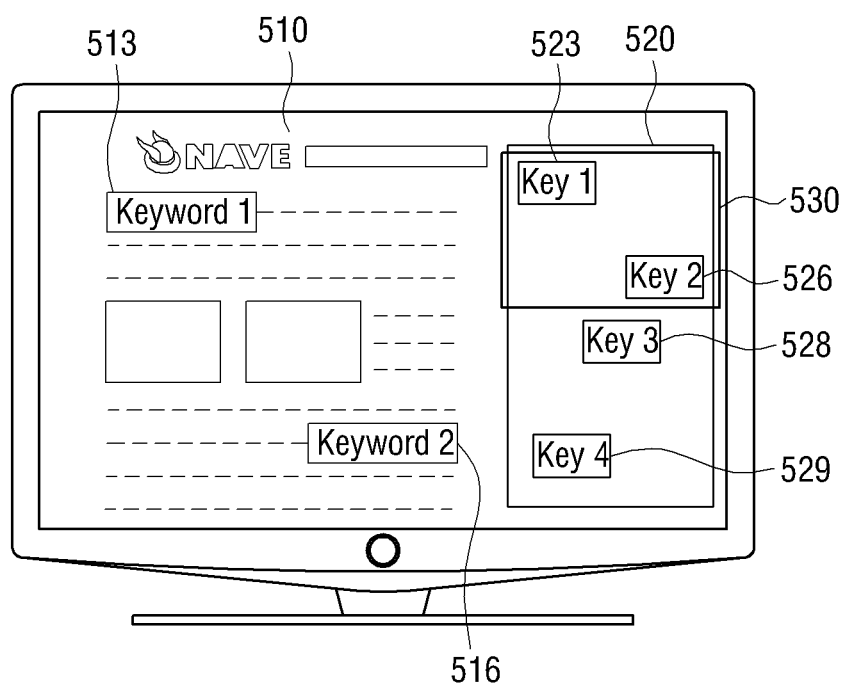
FIG. 5 is a diagram illustrating a screen on which keywords are displayed on a web page reduction map according to an exemplary embodiment.

FIG. 5 is a diagram illustrating a screen on which keywords are displayed on a web page reduction map 520 according to an exemplary embodiment.

According to the TV 100 illustrated in FIG. 5, the accessed web page 510 is displayed on the screen of the TV 100 and a web page reduction map 520 is displayed on the right side of the screen. Also, "keyword 1" (513) and "keyword 2" (516) that correspond to the keywords are displayed on the area displayed on the screen in distinction from other contents. As described above, the TV 100 displays highlight on the keyword, and thus the user can easily recognize it.

Also, the web page reduction map 520 is displayed as a diagram in the form of a tetragonal that has the same aspect ratio as that of the web page currently accessed. Also, on the web page reduction map 520, a current screen area 530 that indicates an area in which the current screen is displayed is displayed together. Also, four keywords 523, 526, 528, and 529 are displayed on the web page reduction map 520. As described above, if the keywords are displayed on the web page reduction map 520, a user can easily recognize where the keywords are displayed on the whole web page.

As illustrated in FIG. 5, "keyword 1" (513) and "keyword 2" (516) displayed on the screen correspond to "key 1" (523) and "key 2" (526) displayed on the web page reduction map 520, respectively.

As described above, if the keywords are displayed on the web page reduction map 520, a user can easily confirm where the keywords are displayed on the whole web page.

Referring again to FIG. 2, the TV 100 selects any one of the extracted keywords according to a user's operation (S260). If any one of the keywords displayed on the screen is selected, the TV 100 provides a function for the selected keyword. A function for the selected keyword may be a function of performing an additional search or a screen movement function.

In the case where the TV 100 is set to perform an additional search function (S270-Y), the TV 100 performs an additional search by setting the selected keyword as any one of an addition keyword, an excluded keyword, and a unique keyword (S275).

Here, the additional keyword is a keyword for an additional search conducted by including the selected keyword into the specified keyword that is the previously used keyword. That is, the TV 100 performs a search for sites that include all the specified keyword and the additional keyword. For example, if it is assumed that the specified keyword is "movie" and the keyword that is selected as the additional keyword is "drama", the TV 100 performs an additional search for "movie drama".

Also, the excluded keyword indicates a keyword that excludes the result that includes the selected keyword from the results searched by the specified keyword. Accordingly, the TV 100 performs a search with the specified keyword, and displays the search result through exclusion of all results including the excluded keyword. For example, if it is assumed that the specified keyword is "movie", and a keyword that is selected as the excluded keyword is "drama", the TV 100 excludes all results that include "drama" from the search results that are obtained by performing a search with the keyword "movie", and displays the remaining search results on the screen.

Also, the unique keyword indicates a keyword for performing a further search with the selected keyword as an independent keyword. Accordingly, if the selected keyword is set as the unique keyword, the TV 100 performs an additional search with only the selected keyword as a keyword.

Figure 6:
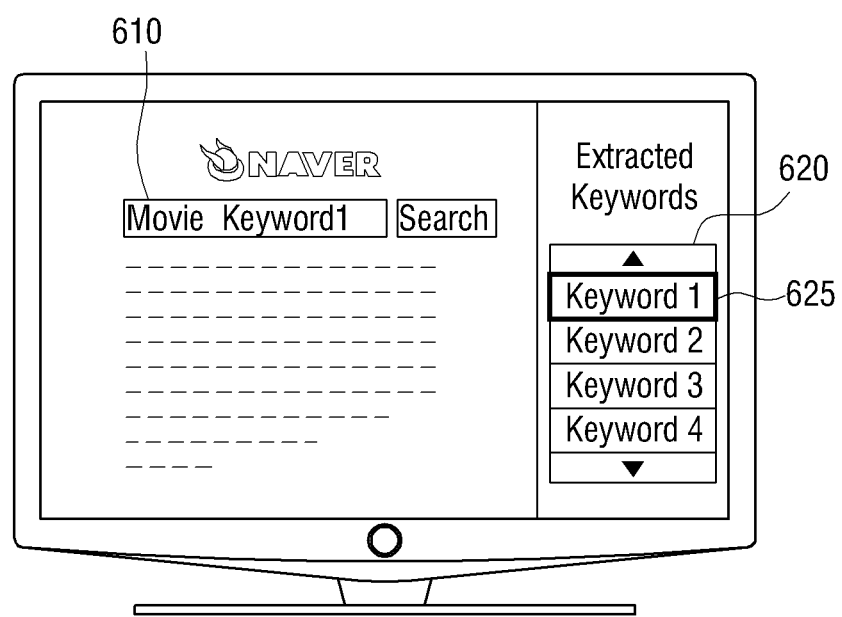
FIG. 6 is a diagram illustrating a screen on which a selected keyword is input as an additional keyword according to an exemplary embodiment.

As described above, the TV 100 may provide an additional search function, and with this respect, a detailed explanation will be made with reference to FIG. 6. FIG. 6 is a diagram illustrating a screen on which a selected keyword is input as an additional keyword according to an exemplary embodiment.

In the case of FIG. 6, it is assumed that the specified keyword used for the existing search is "movie". That is, it is assumed that the web page that is the subject of keyword extraction is the web page that is searched and accessed with the keyword "movie".

As illustrated in FIG. 6, if "keyword 1" item 625 is selected from the keyword list 620, the TV 100 re-performs the search by inputting "movie keyword 1" onto a keyword input window 610 on the screen.

As described above, the TV 100 may perform a further search with the selected keyword as an additional keyword. Also, the TV 100 can perform the further search by setting the selected keyword as an excluded keyword or a unique keyword.

Referring again to FIG. 2, the TV 100 may be set to perform a function of moving a screen to an area in which the selected keyword is displayed. That is, if the keyword is selected in a state where the TV 100 is set to perform the screen movement function (S280), the TV 100 moves the screen to the area in which the selected keyword is displayed in the currently accessed web page area (S285). In this case, the TV may move the screen so that the selected keyword is displayed in an upper end or an intermediate area of the screen. In relation to this, a detailed explanation will be made hereinafter with reference to FIGS. 7 and 8.

Figure 7:
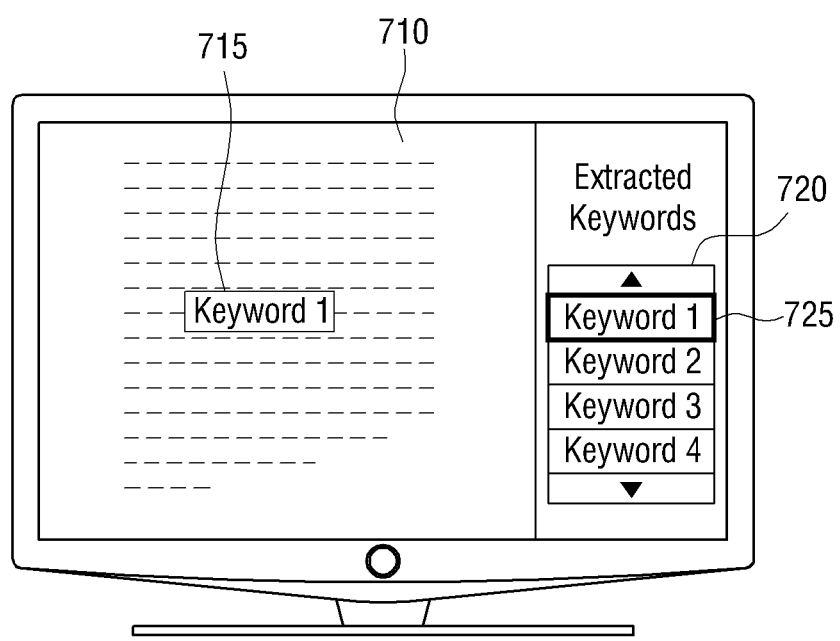
FIG. 7 is a diagram illustrating the movement of a screen so that a selected keyword is displayed in the center of the screen.

FIG. 7 is a diagram illustrating the movement of a screen so that a selected keyword is displayed in the center of the screen.

As illustrated in FIG. 7, if "keyword 1" item 725 is selected from the keyword list 720, the TV 100 moves the screen that is displayed in a web page display area 710 to an area in which "keyword 1" (715) is displayed.

Particularly, in FIG. 7, the screen has been moved so that "keyword 1" (715) is displayed in the intermediate area of the screen.

Figure 8:
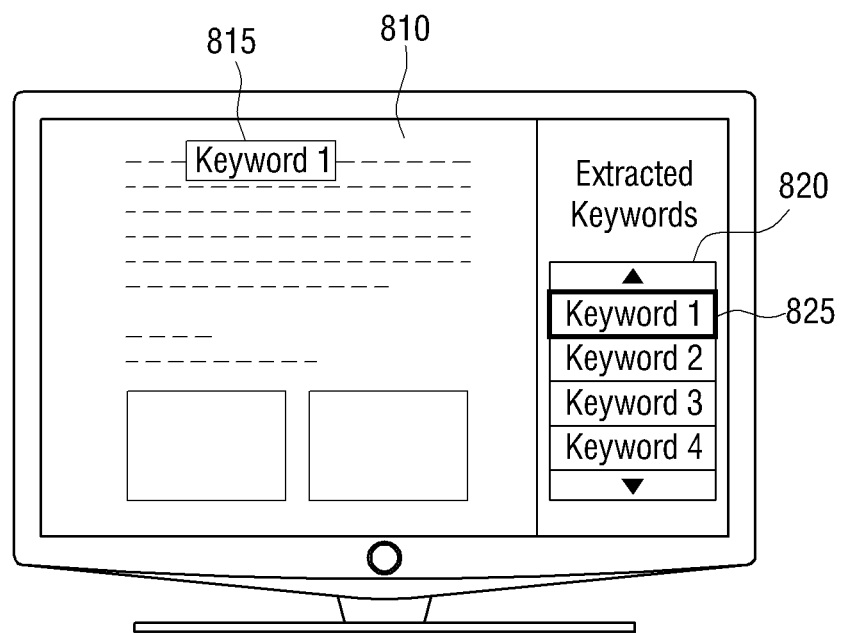
FIG. 8 is a diagram illustrating the movement of a screen so that a selected keyword is displayed on an upper end of the screen.

FIG. 8 is a diagram illustrating the movement of a screen so that a selected keyword is displayed on an upper end of the screen.

As illustrated in FIG. 8, if "keyword 1" item 825 is selected from the keyword list 820, the TV 100 moves the screen that is displayed in a web page display area 810 to an area in which "keyword 1" (815) is displayed. Particularly, in FIG. 8, it can be confirmed that the screen has been moved so that "keyword 1" (815) is displayed on the upper end of the screen.

As described above, the TV 100 can move the screen to the area in which a keyword selected by a user is displayed. Accordingly, a user can select a desired keyword and directly confirm the portion in which the keyword is displayed.

Through the above-described process, the TV 100 extracts and displays the keyword that is related to the currently accessed web page, and thus a user can confirm and select a desired keyword even without inputting a separate keyword. Also, if the keyword is selected, the TV 100 performs an additional search using the selected keyword or moves the screen to the position where the keyword is displayed, and thus a user can perform the additional search for desired contents or confirm the contents of the web page related to the keyword only by an operation for selecting the keyword.

Also, in this exemplary embodiment, although it is exemplified that the display device is the TV, any display device that can perform the Internet search function can also be applied in addition to the TV 100. For example, the display device may be a portable phone, a PMP, an MP3, and the like, to which the technical features of the exemplary embodiments can be applied.

According to diverse exemplary embodiments, a method of providing a search service and a display device applying the same can be provided, which can access a web page that is searched by a specified keyword, extract at least one keyword in text included in the web page being accessed, and display the at least one extracted keyword, and thus a user can perform a search by easily inputting a desired keyword.

Also, if a keyword is selected, the screen is moved to a position where the keyword exists on the web page, and thus a user can easily move to the position of the desired keyword on the web page.

While the inventive concept has been shown and described with reference to certain exemplary embodiments thereof, it will be understood by those skilled in the art that various changes in form and detail may be made therein without departing from the spirit and scope of the inventive concept, as defined by the appended claims.

What is claimed is:

1. A method of providing a search service, the method comprising:
    accessing, according to a user input, a web page from among a plurality of web pages that are searched by a specified keyword; wherein the accessing comprises selecting, according to the user input, one web page among the plurality of web pages and accessing the selected web page;
    extracting at least one keyword in text included in the accessed web page, the at least one keyword being different from the specified keyword; and
    displaying the at least one extracted keyword independently of the specified keyword,
    wherein the displaying the at least one keyword comprises:
        displaying a diagram adjacent to the accessed web page; and
        displaying the at least one keyword in the diagram, wherein a horizontal position and a vertical position of the at least one keyword in the diagram respectively correspond to a horizontal position and a vertical position of the at least one keyword in the accessed web page.

2. The method of providing the search service as claimed in claim 1, wherein the accessing the web page comprises:
    requesting a search for the specified keyword from a search engine;
    receiving a search result from the search engine and displaying the received search result on a screen; and
    accessing one web page among web pages that are included in the search result.

3. The method of providing the search service as claimed in claim 1, wherein the extracting the at least one keyword comprises extracting a word based on a distance between the word and the specified keyword within the accessed web page.

4. The method of providing a search service as claimed in claim 1, wherein the extracting the at least one keyword comprises extracting the at least one keyword among the text included in an area that is displayed on the screen of the web page.

5. The method of providing the search service as claimed in claim 1, wherein the extracting the at least one keyword comprises extracting the at least one keyword in an order of a number of repetitions of words included in the web page.

6. The method of providing the search service as claimed in claim 1, wherein the displaying the at least one extracted keyword comprises displaying the at least one keyword in a list.

7. The method of providing the search service as claimed in claim 1, further comprising:
  selecting a keyword of the at least one keyword; and
  performing the search by setting the selected keyword as one of an additional keyword, an excluded keyword, and a unique keyword.

8. The method of providing the search service as claimed in claim 1, further comprising:
  selecting a keyword of the at least one keyword; and
  moving a screen to an area in which the selected keyword is displayed.

9. The method of providing the search service as claimed in claim 8, wherein the moving the screen comprises moving the screen so that the selected keyword is displayed on an upper end or an intermediate area of the screen.

10. The method of providing the search service as claimed in claim 1, wherein the displaying comprises displaying the accessed web page in a first area of a screen and the at least one extracted keyword in a second area of the screen that is separate from the first area.

11. The method of providing the search service as claimed in claim 1, wherein the diagram has an aspect ratio that corresponds to that of an entire web page that is currently accessed.

12. The method of providing the search service as claimed in claim 1, wherein the displaying the diagram comprises displaying, on the diagram, an indicator indicating an area that corresponds to a currently displayed portion of the accessed web page.

13. A display device comprising:
  a communication unit configured to communicate with an external device and a network;
  a display unit configured to display an image; and
  a control unit configured to control the communication unit to access, according to a user input, a web page from among a plurality of web pages that are searched by a specified keyword, extract at least one keyword in text included in the accessed web page, and control the display unit to display the at least one extracted keyword independently of the specified keyword, wherein the at least one keyword is different from the specified keyword,
  wherein the control unit selects, according to the user input, one web page among the plurality of web pages and access the selected web page,
  wherein the control unit controls the display unit to display a diagram adjacent to the accessed web page, and
  wherein the control unit controls the display unit to display the at least one keyword in the diagram, wherein a horizontal position and a vertical position of the at least one keyword in the diagram respectively correspond to a horizontal position and a vertical position of the at least one keyword in the accessed web page.

14. The display device as claimed in claim 13, wherein the control unit requests a search for the specified keyword from a search engine, receives a search result from the search engine, controls the display unit to receive search result on a screen, and accesses one web page from among web pages that are included in the search result.

15. The display device as claimed in claim 13, wherein the control unit extracts a word based on a distance between the word and the specified keyword within the accessed web page.

16. The display device as claimed in claim 13, wherein the control unit extracts the at least one keyword among the text included in an area that is displayed on a screen of the web page.

17. The display device as claimed in claim 13, wherein the control unit extracts the at least one keyword in order of a number of repetitions of the at least one keyword in the web page.

18. The display device as claimed in claim 13, wherein the control unit controls the display unit to display the at least one keyword in the form of a list.

19. The display device as claimed in claim 13, wherein the control unit selects a keyword of the at least one keyword, and performs a search by setting the selected keyword as one of an additional keyword, an excluded keyword, and a unique keyword.

20. The display device as claimed in claim 13, wherein the control unit selects a keyword of the at least one keyword and moves a screen to an area in which the selected keyword is displayed.

21. The display device as claimed in claim 20, wherein the control unit moves the screen so that the selected keyword is displayed on an upper end or an intermediate area of the screen.

22. The display device as claimed in claim 13, wherein the control unit controls the display unit to display the accessed web page in a first area of a screen and the at least one extracted keyword in a second area of the screen that is separate from the first area.

23. A method of providing a search service comprising:
  searching for a specified keyword using a search engine;
  displaying a plurality of web pages containing the specified keyword;
  selecting, according to a user input, a web page of the plurality of web pages;
  extracting at least one keyword from text included in the selected web page; the at least one keyword being different from the specified keyword; and
  displaying the specified keyword and the at least one extracted keyword independently of each other,
  wherein the displaying the at least one keyword comprises:
    displaying a diagram adjacent to the selected web page; and
    displaying the at least one keyword in the diagram, wherein a horizontal position and a vertical position of the at least one keyword in the diagram respectively correspond to a horizontal position and a vertical position of the at least one keyword in the selected web page.

24. The method of providing the search service as claimed in claim 23, wherein the extracting the at least one keyword from the text included in the selected web page comprises extracting a word based on a distance between the word and the specified keyword within the selected web page.

25. The method of providing the search service as claimed in claim 23, wherein the extracting the at least one keyword from the text included in the selected web page comprises extracting the at least one keyword based on a number of repetitions of the at least one keyword in the text included in the selected web page.

26. The method of providing the search service as claimed in claim 23, wherein the displaying the specified keyword and the at least one extracted keyword comprises displaying the selected web page in a first area of a screen and the at least one extracted keyword in a second area of the screen that is separate from the first area.

27. A display device comprising:
  a communication unit which is configured to communicate with an external device and a network;
  a display unit which displays an image;

a control unit which controls the display unit and the communication unit to search for a specified keyword using a search engine, control the display unit to display a plurality of web pages containing the specified keyword, select, according to a user input, one of the plurality of web pages, extract at least one keyword from text included in the selected web page, and control the display unit to display the specified keyword and the at least one extracted keyword independently of each other, wherein the at least one keyword is different from the specified keyword, wherein the control unit controls the display unit to display a diagram adjacent to the selected web page, and wherein the control unit controls the display unit to display the at least one keyword in the diagram, wherein a horizontal position and a vertical position of the at least one keyword in the diagram respectively correspond to a horizontal position and a vertical position of the at least one keyword in the selected web page.

28. The display device as claimed in claim 27, wherein the control unit extracts the at least one keyword from the text included in the selected web page by extracting a word based on a distance between the word and the specified keyword within the selected web page.

29. The display device as claimed in claim 27, wherein the control unit extracts the at least one keyword according to a number of repetitions of the at least one keyword in the text included in the selected web page.

30. The display device as claimed in claim 27, wherein the control unit controls the display unit to display the selected web page in a first area of a screen and the at least one extracted keyword in a second area of the screen that is separate from the first area.

* * * * *